United States Patent [19]

Rosenstock

[11] 4,396,924

[45] Aug. 2, 1983

[54] RECORDING HEAD FOR INK MOSAIC PRINTERS

[75] Inventor: Günter Rosenstock, Munich, Fed. Rep. of Germany

[73] Assignee: Siemens Aktiengesellschaft, Berlin & Munich, Fed. Rep. of Germany

[21] Appl. No.: 206,137

[22] Filed: Nov. 12, 1980

[30] Foreign Application Priority Data

Dec. 10, 1979 [DE] Fed. Rep. of Germany ....... 2949616

[51] Int. Cl.$^3$ .............................................. G01D 15/18

[52] U.S. Cl. .................................................. 346/140 R

[58] Field of Search ..................................... 346/140 R

[56] References Cited

U.S. PATENT DOCUMENTS

| | | | |
|---|---|---|---|
| 3,714,928 | 2/1973 | Taylor | 118/624 |
| 4,131,899 | 12/1978 | Christou | 346/140 R |
| 4,158,847 | 6/1976 | Heinzl et al. | 346/140 |
| 4,216,483 | 8/1980 | Kyser et al. | 346/140 |

FOREIGN PATENT DOCUMENTS 2429232 1/1976 Fed. Rep. of Germany .

OTHER PUBLICATIONS

IBM Technical Disclosure Bulletin, vol. 16, No. 6, Nov. 1973.

*Primary Examiner*—Joseph W. Hartary

*Attorney, Agent, or Firm*—Hill, Van Santen, Steadman, Chiara & Simpson

[57] ABSTRACT

A recording head for ink mosaic printers has a plurality of channels communicating with an ink supply each of which has an individually controllable electro-mechanical transducer operable to eject ink droplets from respective channels and each channel further having at least two nozzle openings through which the ink is ejected toward a carrier medium for achieving a finer pattern of droplets on the carrier medium for improved resolution and adaptability to different types of texts.

1 Claim, 4 Drawing Figures

RECORDING HEAD FOR INK MOSAIC PRINTERS

BACKGROUND OF THE INVENTION

1. Field of the Invention

The present invention relates to recording heads for ink mosaic printers, and in particular to such recording heads having a plurality of channels for ejecting the recording liquid toward a carrier medium operated by an electro-mechanical transducer.

2. Description of the Prior Art

Ink mosaic recorders having recording heads are known in the art in which a number of recording channels communicate between an ink supply and a nozzle or other termination of the channel from which the ink is ejected toward a carrier medium. The ink may be ejected from the channels in the form of individual ink droplets by the selected operation of individual transducer elements surrounding the channels, such as piezoelectric elements which when operated by application of suitable electronic pulses bring about a change in pressure in the respective channel by means of contraction and expansion of the element. A recording head of this type is disclosed in German OS No. 25 43 451, corresponding to U.S. Pat. No. 4,158,847. The recording head disclosed therein may contain, for example, twelve channels having twelve openings which form two parallel rows each containing six nozzles. A recording head of this type enables the recording of arbitrary characters within a 12×9 array on a data carrier.

For the practical use of an ink mosaic recorder it is not only necessary to insure operation which meets the technical requirements, but also a good recording quality must be achieved. The latter consideration presents several problems if the mosaic recording process involves the formation of individual characters by droplets of recording liquid applied in punctiform manner to a recording medium, such as paper. Thus, for example, it must be insured that the droplets of ink applied to the paper dry sufficiently rapidly to avoid smearing of the text. If an ink is used which penetrates rapidly into the fibers of the paper, even if the ink drying time is minimal, the ink will be visible on the reverse side of the paper. In order to avoid this latter disadvantage, it is known to use an ink and paper combination which together limit the flow properties of the ink once applied to the paper. This attempted solution has the disadvantage, however, that the expansion of the ink droplets sprayed onto the paper is reduced to such an extent that the punctiform arrangement of the individual characters become apparent and the overall text loses the appearance of continuity for the reason that the individual ink droplets forming the character no longer overlap sufficiently.

Proposed solutions to counteract these effects, such as increasing the size of the ejected ink droplets or utilizing a narrower distribution of the recording nozzles, all involve a substantial mechanical outlay and contribute to an increasingly complex recording head. For example, an increase in the size of the ink droplets results in greater ink consumption, a longer drying period, a higher impact sensitivity of the nozzles, and, as a result of the formation of so-called "satellite" droplets, to a poorer formation of droplets. Narrowing the distribution of the recording nozzles necessitates a larger number of channels inside the recording head and leads to increased production cost.

SUMMARY OF THE INVENTION

It is an object of the present invention to provide a recording head for ink mosaic recorders which, without increasing the number of recording channels, permits the use of a recording liquid which has reduced flow properties and whose use is not governed by the quality of the paper being used, which recording head achieves improved quality in the visual appearance of the text.

The above object is inventively achieved in a recording head of the type, for example, disclosed in U.S. Pat. No. 4,158,847 wherein each channel terminates in at least two nozzle openings. The channel terminations may be achieved by the use of a nozzle plate which covers the portion of the recording head closest to the recording medium and which has two or more apertures for each channel, or may be achieved by dividing the channel into two or more nozzle openings within the recording head itself.

Either structure employing the inventive concept disclosed herein allows the production of very fine lines, at least in a vertical recording direction, which lines may be widened if required. This structure also allows characters to be represented in a form of printing text known as "shadow text". The virtually exact circular form of the individual droplets allows the production of characters which have an extremely sharply defined edge and a high density. Moreover, the reduction in the size of the individual droplet diameters which is achieved by the inventive structure reduces ink consumption, shortens the drawing time of the droplets on the paper, and prevents the text from penetrating through the paper. For these reasons, the quality of the text is substantially independent of the flow properties of the ink and the paper, so that paper of any quality may be utilized as the recording medium with the present invention.

DESCRIPTION OF THE PREFERRED EMBODIMENTS

Figure 1:
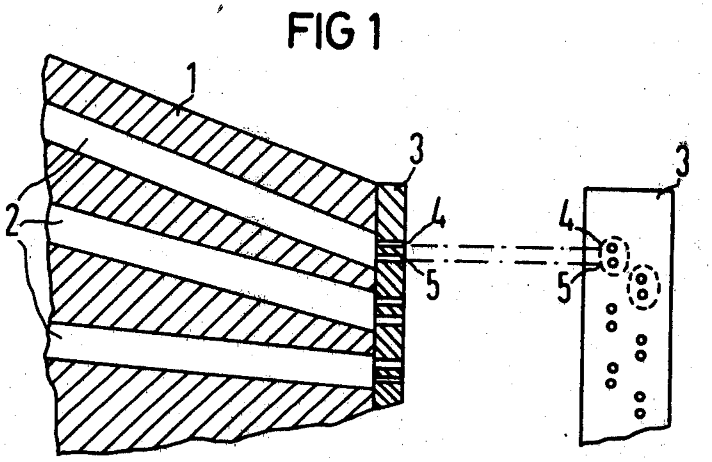
FIG. 1 is a schematic representation, partly in section, of a portion of a recording head constructed in accordance with the principles of the present invention employing a nozzle plate, shown also in plan view.

A recording head 1 is partially illustrated in FIG. 1 which may be manufactured, for example, by injection molding. The recording head 1 may be of a type, for example, as is disclosed and claimed in U.S. Pat. No. 4,158,847, however elements of the recording head not necessary to describe the inventive improvement disclosed and claimed herein have been omitted. The recording head 1 faces a recording medium (not shown) in a recording position. A plurality of recording channels 2 are disposed within the recording head 1, and the recording head 1 has a face thereof closest to the recording carrier which is covered by a nozzle plate 3. The recording channels 2 lead away from the nozzle plate 3 without bending and communicate with an ink supply. Ink is compressed in the direction of the nozzle plate 3 via the channels 2 by means of selected operation of drive elements (not illustrated) which may consist, for example, of piezoelectric transducers. The discharged ink is sprayed in the form of droplets through the nozzle plate 3 towards the recording medium in a substantially parallel direction of light.

In the embodiment shown in FIG. 1, the nozzle plate has two nozzle openings 4 and 5 for each channel 2. It will be understood, however, that more nozzle openings for each channel 2 may be provided without departing from the inventive concept herein as requirement warrant. The two nozzle openings 4 and 5 are disposed vertically above one another in the region of each channel 2. In comparison to known recording heads in which each ink channel is assigned only one nozzle opening, each of the nozzle openings 4 and 5 has approximately one half of the diameter of such a conventional nozzle opening. The nozzle plate 3 thus contains a uniformly graduated row of nozzles at halved spacing. The ink droplets ejected through the nozzles 4 and 5 have a smaller diameter than those discharged in known ink recording heads. This arrangement of the nozzle openings 4 and 5 in the nozzle plate 3 results in "points" which were previously formed by a single ink droplet now being comprised of two ink droplets arranged one above another.

As shown in FIG. 1, the nozzle openings may form two parallel rows with the nozzle openings disposed in the second row being offset relative to those in the first row by half of a graduation spacing. The nozzle openings may, however, be arranged in a single vertical row.

Figure 2:
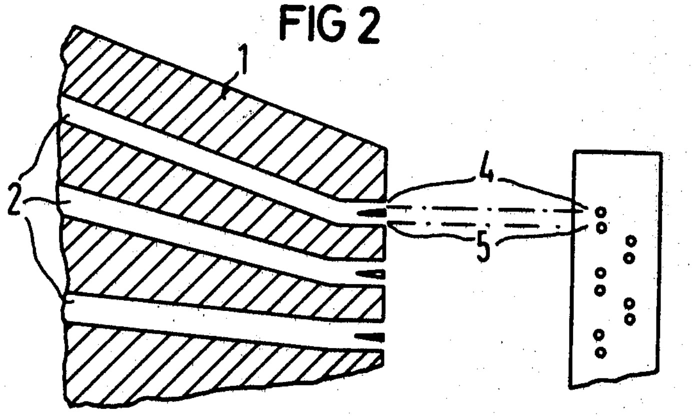
FIG. 2 is a schematic representation of a portion of a recording head constructed in accordance with the principles of the present invention wherein the nozzles are formed in the recording head, and are shown in plan view.

A further embodiment is shown in FIG. 2 which does not require the use of a nozzle plate. In the embodiment of FIG. 2, the terminations of the channels 2 in th recording head 1 which directly face the recording position integrally include the nozzle openings. Again, each channel 2 has two nozzle openings 4 and 5. This is achieved by dividing each channel into two sub-channels in the region of its outlet opening. Again, there is no increase in the number of channels inside the recording head and moreover no additional drive elements are required. As explained in connection with FIG. 1, the nozzle openings may either be arranged in a vertical row or can be disposed in two parallel rows as shown in the plan view portion of FIG. 2.

Figure 3:
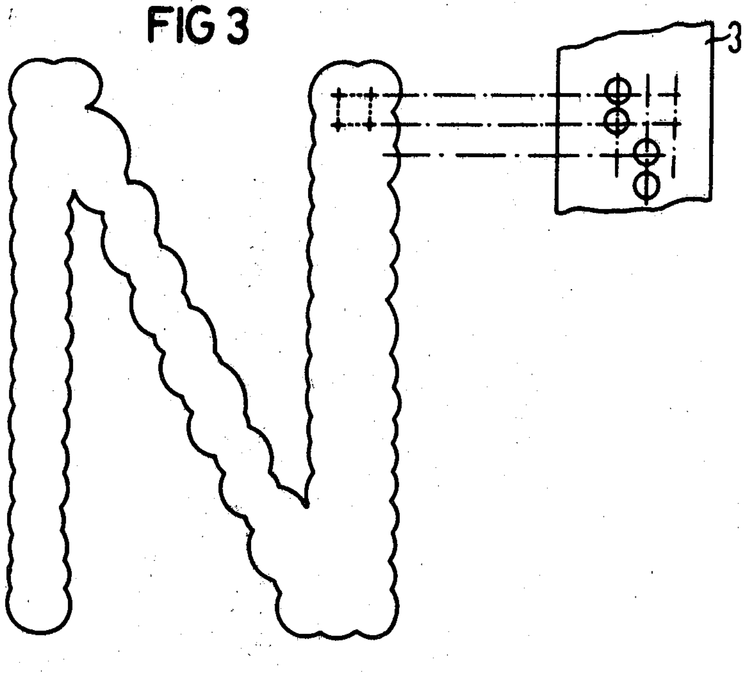
FIG. 3 is a greatly enlarged exemplary letter N as generated by an arrangement of nozzle openings shown in plan view.

The thickness of printed lines can be increased in a simple fashion by suitable operation of the drive elements associated with the channels 2. If each drive element for those channels required to record a particular character are twice operated in sequence, each point of the character will be composed of four separate droplets which represent a quadrilateral on the data carrier. In the quadrilateral the individual ink droplets will overlap and form a dense element with a well-defined border. This manner of operation is represented in FIG. 3 wherein the letter N is printed with the left vertical line and the diagonal line being formed by a single excitation of the drive elements and the right perpendicular line being formed by a double excitation of the appropriate drive elements. This process is highly suitable for printing various type forms, such as the so-called "shadow text."

Figure 4:
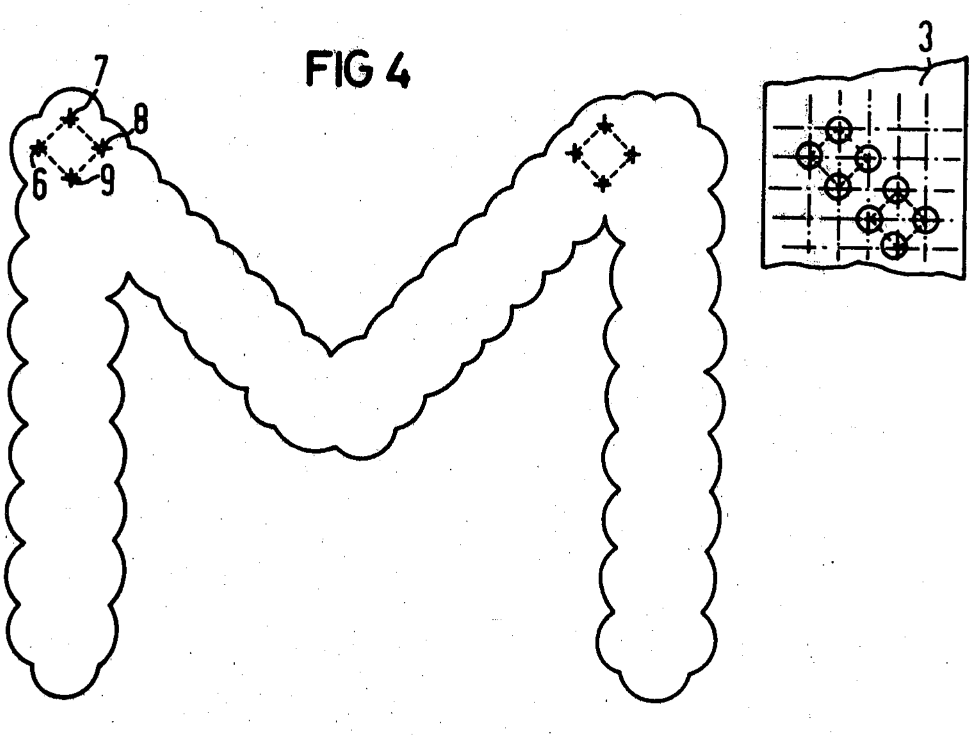
FIG. 4 is a greatly enlarged exemplary letter M as generated by an arrangement of nozzle openings shown in plan view.

Other arrangements of the nozzle openings with respect to each channel are also possible within the scope of the present invention. One example is shown in FIG. 4 in which each channel is assigned four nozzle openings arranged in the form of a rhombus. A rhombus pattern is thus also produced for each print of a printed character. It is preferable to dispose the nozzle openings in the form of the rhombus in two parallel rows and to dispose the lowest nozzle opening of a rhombus located in the first row and the uppermost nozzle opening of the rhombus which follows in the second row at the same level. This considerably improves constrictions which may occur in this arrangement for the vertical lines as the two droplets of ink are then arranged one above the other in those portions of the character which are difficult to print and which require an intensified propagation of ink.

The arrangement of nozzle openings as shown in FIG. 4 offers inmproved printing in particular for diagonal lines of characters. For this purpose, it is preferable to select the angular values of the nozzle openings arranged in the rhombus form to be in the same order of magnitude as the angular values for the diagonal line of the characters.

Although modifications and changes may be suggested by those skilled in the art it is the intention of the inventor to embody within the patent warranted hereon all changes and modifications as reasonably and properly come within the scope of his contribution to the art.

I claim as my invention:

1. A recording head for use in an ink mosaic recording device comprising a plurality of channels in said recording head communicating with an ink supply, said channels terminating at a common face adjacent to a recording medium, an individually operable electromechanical transducer associated with each channel for selectively ejecting droplets of ink from said channels, each channel terminating in four nozzle openings disposed at the corner of a rhombus on said face and said nozzle openings being disposed in at least two parallel rows, with a lowest nozzle opening of a rhombus in a first row of nozzle openings and an uppermost nozzle opening of a rhombus in a row parallel thereto being disposed at the same level.

* * * * *